United States Patent [19]

Zinser, Jr.

[11] Patent Number: 5,440,544
[45] Date of Patent: Aug. 8, 1995

[54] INTEGRATED DATA LINK CONCEPT FOR AIR TRAFFIC CONTROL APPLICATIONS

[75] Inventor: Richard L. Zinser, Jr., Schenectady, N.Y.

[73] Assignee: General Electric Company, Schenectady, N.Y.

[21] Appl. No.: 173,226

[22] Filed: Dec. 27, 1993

[51] Int. Cl.$^6$ ........................ H04J 4/00; H04M 11/00
[52] U.S. Cl. ...................... 370/50; 370/76; 370/95.3; 375/285; 375/346; 379/63; 455/63
[58] Field of Search ................ 370/6, 24, 29, 30, 50, 370/69.1, 76, 95.1, 95.3, 104.1, 110.1, 110.4, 111, 118; 375/5, 7, 17, 24, 41, 42, 52, 56, 57, 58, 99, 122; 455/33.1, 33.2, 46, 63; 379/58, 59, 60, 63

[56] References Cited

U.S. PATENT DOCUMENTS

| | | | |
|---|---|---|---|
| 3,875,339 | 4/1975 | Gruen et al. | 370/76 |
| 4,256,925 | 3/1981 | Goode | 370/95.3 |
| 4,512,013 | 4/1985 | Nash et al. | 370/118 |
| 4,675,863 | 6/1987 | Paneth et al. | 370/50 |
| 4,757,495 | 7/1988 | Decker et al. | 370/76 |

OTHER PUBLICATIONS

Nov. 1993—"Integrated VHF Data Link for Air Traffic Control Applications", Handouts for a Presentation at the Air Traffic Control Assoc. (ATCA) Conference.
Nov. 1993—"12.5 khz Offset Channel High Capacity VHF Data Link", Handouts Given During the Presentation to the FAA at Emergy Riddle Aeronautical Univ., Daytona Beach, Fla.
Apr. 1993—Confidential 'White Paper' Marked as 'GE Confidential' Sent to the Federal Aviation Administration (FAA) in Response to a Broad Area Announcement RFI 930219-0465.
Dec. 1992—"Integrated VHF Data Link Concept for Air Traffic Control Applications", Slides of a Talk Given to the FAA at General Electric CR&D, Schenectady, N.Y.; and the FAA and Mitre Corp. which Evaluates Proposals for the FAA, at the FAA.
Oct. 1992—"Integrated VHF Data Link Concept for Air Traffic Control Applications", Slides of a Talk Given to the FAA and Mitre Corp., Washington, D.C.
Oct. 1992—"Integrated VHF Data Link Concept for Air Traffic Control Applications" Provided as a Confidential Document to the FAA and Mitre Corp.

Primary Examiner—Alpus Hsu
Attorney, Agent, or Firm—Lawrence P. Zale; Marvin Snyder

[57] ABSTRACT

An integrated full duplex radio data link for aircraft capable of a sustained 4 to 8 Mb/sec raw data transfer rate communicates on newly proposed dedicated digital channels (DDC) for radio communications between the existing analog VHF amplitude modulated (AM) voice channels, and causes no perceptible interference to the remaining AM voice channels. While the present invention is intended primarily for terminal areas and airport surface applications, it may be employed with enroute applications. The present invention transmits AM encoded digital aircraft identification information appended to AM voice transmissions. An ground unit strips off the aircraft identification and assigns a DDC frequency to that aircraft unit over a control uplink channel (CUC) for further data communication. Downlink information, such as acknowledgement of the DDC assigned is transmitted over a digital control downlink channel (CDC). Data communication then proceeds on the DDC. The data is transmitted as a low power encoded signal having a constant envelope, and narrow bandwidth. Any interference from the DDC into the AM voice channel appears as background "white noise" to the AM receiver. The channel assignment scheme allows the present invention to function at an acceptable bit error rate.

10 Claims, 2 Drawing Sheets

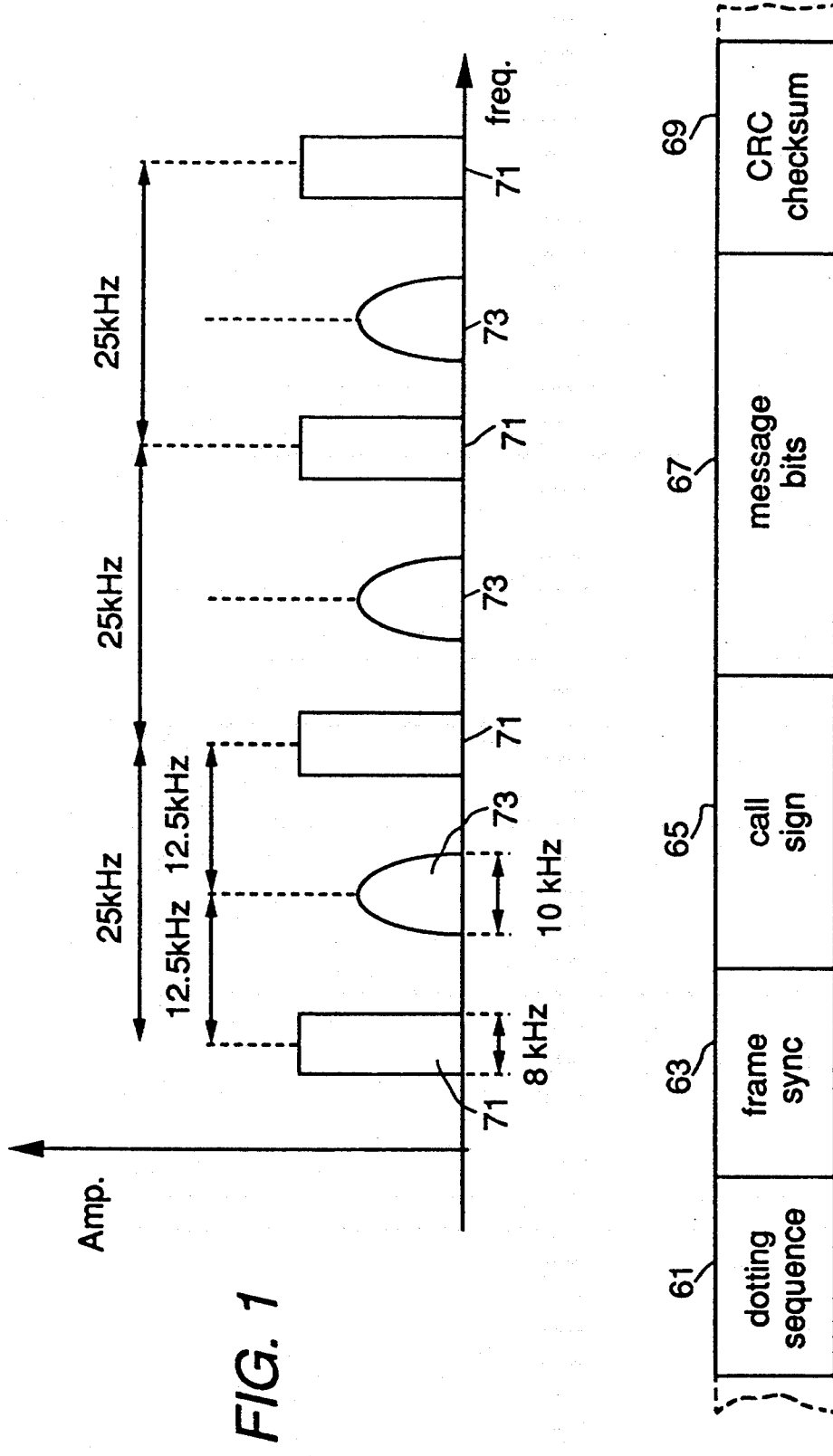

INTEGRATED DATA LINK CONCEPT FOR AIR TRAFFIC CONTROL APPLICATIONS

BACKGROUND OF THE INVENTION

1. Field of the Invention

This invention relates to aircraft radio communications and more specifically to aircraft digital radio communication between an aircraft and an air traffic controller, or between aircraft.

2. Description of Related Art

In aircraft communication, there is a great deal of information which is communicated between an aircraft and an air traffic controller before and during each flight. Much of this is done by conventional analog VHF amplitude modulated (AM) radio voice communication. This tends to be very inefficient.

A number of 25 kilo Hertz (kHz) voice channels are currently allocated in the 118 megahertz (MHz) to 137 MHz in the conventional analog AM aircraft radio band. Each AM channel is allocated to an airport, with busier airports having several channels. Each radio tuned to an AM channel receives messages for all aircraft tuned to that channel. This is analogous to a "party line" service.

In congested terminal areas, the existing AM voice radio channels may become overloaded. There may not be enough time for all of the transmissions required by verbal communication. Also with the estimated expected increase in communication traffic, the problem increases.

An additional problem occurs when several pilots attempt to transmit over a broadcast channel at the same time, producing unrecognizable garble to a receiving unit.

Future aircraft communication requirements may be divided into 3 groups functional groups:

1) ground unit to aircraft unit Air Traffic Control (ATC) functions which are are Clearance Delivery (pre-taxi) messages, Taxi "Clearance" messages, Active Taxi Guidance messages and Direct Cockpit Alert messages.
2) ground unit to aircraft unit surface traffic position reports that define other aircraft and ground vehicles near the aircraft, and
3) aircraft unit position reports for allowing the ground unit to perform surface surveillance.

Aircraft communications must be accomplished by means other than existing analog AM voice transmissions in order to meet future needs.

There are several possible communication methods employing different types of frequency allocations and access methods which may be employed for increasing the communication capacity.

Analog AM on 12.5 kHz Channel Spacings (Analog FDMA)

In this scheme, messages are communicated by analog VHF AM voice modulation on 12.5 kHz spaced AM voice channels, these being ½ the width of the existing 25 kHz frequency bands. This may also be known as analog frequency division multiple access (FDMA). While this may be the simplest technological alternative that offers a factor of 2 increase in capacity, it is the most limiting for future expansion, and has no data transmission, or "data link" capacity. The system could be compatible with existing 25 kHz AM, in that none of the existing voice frequency assignments will need to be changed; however, frequency stability requirements may have to be increased to prevent interference between adjacent channels.

Full FDMA Digital Voice

In full frequency division multiple access (FDMA), the entire VHF band would be re-allocated with frequency bands appropriate for digital voice transmissions. With 4 or 8 level digital modulation and modem speech coding technology (6 to 8 kb/sec speech coders), the carrier spacing could be as little as 5 or 6 kHz. This would require oscillator stabilities much greater than the 12.5 kHz spaced system described above. In addition, the existing AM voice service would have to be discontinued as the new service and sparings were brought on line. Opportunities for future expansion are also limited, because an entirely new frequency plan and frequency bands would have to be defined when more efficient speech coders are used.

Wideband TDMA Digital Voice

A wideband time division multiple access (TDMA) digital voice communication scheme would be similar to the technique used for the pan-European (GSM) digital cellular telephone system. A wide bandwidth (i.e. 200-500 kHz) would be reserved for a single RF carrier which all users would monitor that would be time-multiplexed into multiple virtual voice channels with each user being appropriated a time slot in which to transmit or receive data. Wideband TDMA exhibits an efficient use of the spectrum. Since this technique allocates virtual voice channels "on the fly", it is easily adaptable to different data needs, such as adapting to more efficient speech coders. However, wideband TDMA has the same re-allocation problem as full FDMA: multiple existing AM channels have to be decommissioned, and the existing services would be displaced.

Full Band CDMA/Spread Spectrum

In full band code division multiple access (CDMA) all users transmit and receive in the same band. Messages are encoded differently by each source, with a receiver selecting the messages from a desired transmitter. The most efficient form of this scheme would reallocate the entire 19 MHz communications band for Code Division Multiple Access. Because of the spread spectral nature of this approach, the existing AM service could be left intact during the initial phase of the CDMA implementation. However, as the number of CDMA users increase, every single AM channel in the band will incur progressively higher levels of interference. As the number of CDMA users approach 500 in a terminal area, the interference levels to AM users could exceed the 14 dB desired-to-undesired (D/U) ratio, set by the FAA.

Currently, there is a need for a rapid method of aircraft information transmission, thereby allowing additional capacity and flexibility while still allowing a gradual phase out of existing aircraft radio systems.

OBJECTS OF THE INVENTION

An object of the present invention is to provide information communication between an aircraft unit and an ground unit more quickly and accurately than the prior art.

Another object of the present invention is to provide an aircraft radio system capable of supporting the proposed automated Federal Aviation Administration (FAA) programs requiring data communication.

Another object of the present invention is to provide an aircraft radio system having increased channel capacity which also supports existing AM voice channels.

An object of the present invention is to provide a aircraft voice radio system having an expanded number of voice communication channels.

Another object of the present invention is to provide a aircraft radio system having increased channel capacity which is expandable as the demand for additional voice channels grows.

SUMMARY OF INVENTION

A hybrid TDMA/FDMA (also known as narrow-band TDMA) system communicates digital information between an aircraft unit and a ground unit, on newly proposed dedicated data champels (DDC) located between existing 25 kHz AM voice channels. These data channels can provide up to 16 kb/sec raw data transfer rates with a 4 level modulation technique. The 3 decibel (dB) bandwidth of the data channels would be about 8 kHz. Each of these data channels would support a minimum of 2 virtual voice channels via a TDMA access protocol.

The present invention incorporates low transmit power with a near constant envelope, which appears as "white noise" to an AM receiver if the transmitter signal interferes with an adjacent existing AM voice channel.

The communication scheme of the present invention combines the superior: expansion capabilities of TDMA with ease of gradual system transition afforded by FDMA.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 1 is an illustration of spectral allocation of newly proposed dedicated data channels (DDC) between existing AM voice channels.

FIG. 2 is a data structure for an aircraft identification transmission appended to AM voice transmissions.

DETAILED DESCRIPTION OF THE INVENTION

Figure 3:
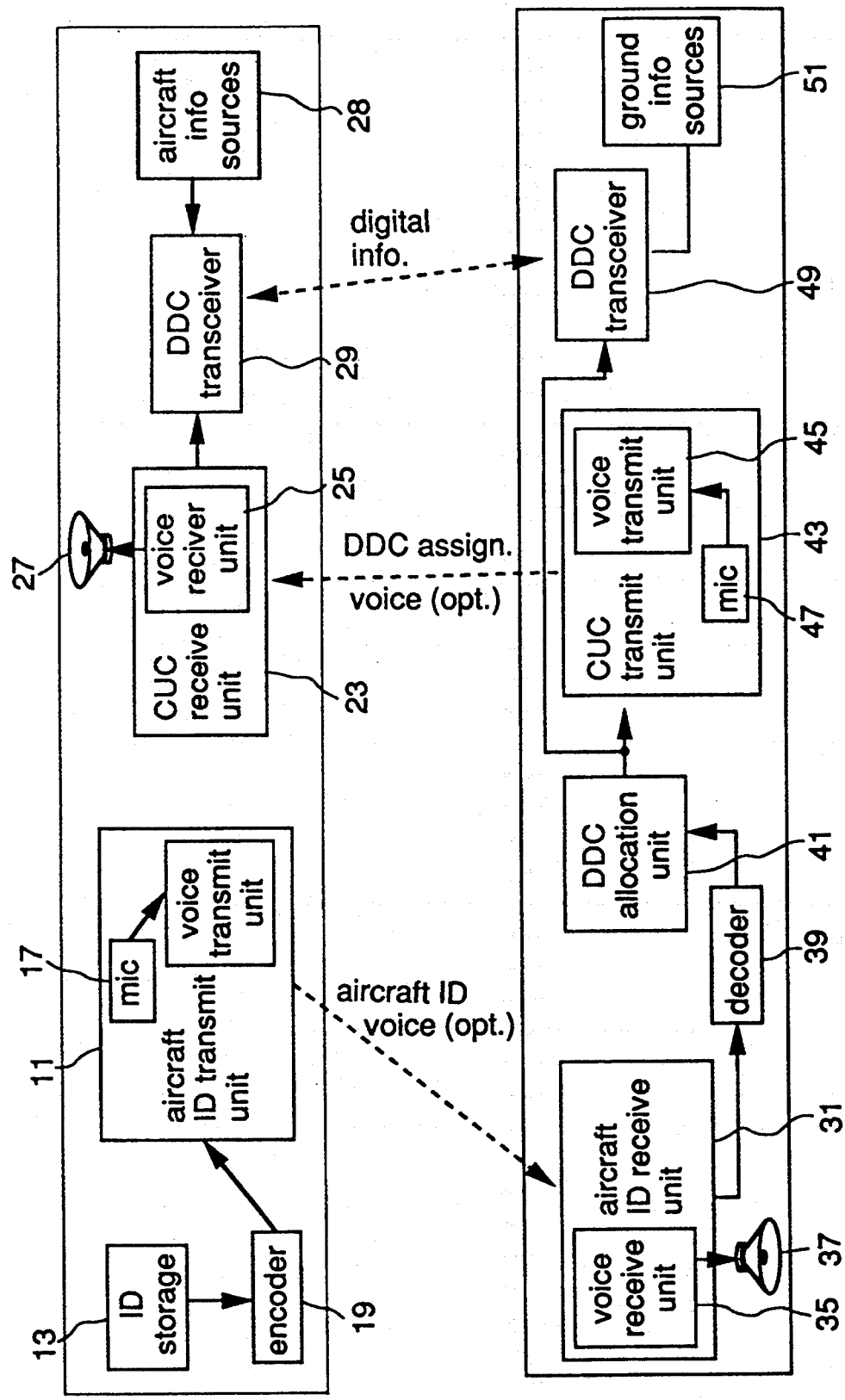
FIG. 3 is a simplified block diagram of the present invention.

In order to properly design the system of the present invention, the data communication requirements must be estimated. The data estimates for:

1) ground unit to aircraft unit ATC functions,
2) ground unit to aircraft unit surface traffic data, and
3) aircraft and vehicle position reports for surface surveillance, are shown in tables 1, 2, and 3 below.

TABLE 1

| Ground unit to Aircraft unit ATC Functions | |
|---|---|
| Data Item | Data Rate Requirement |
| Clearance Delivery | 27 b/sec (100 bytes × 120 |

TABLE 1-continued

| Ground unit to Aircraft unit ATC Functions | |
|---|---|
| Data Item | Data Rate Requirement |
| (pre-taxi) | aircraft/1 hr. |
| Taxi "Clearance" | 27 b/sec (100 bytes × 120 aircraft/1 hr) |
| Active Taxi Guidance | 53 b/sec (25 bytes × 4 messages × 4 active/1 hr) |
| Direct Cockpit Alerts | 400 b/sec (50 bytes/alert, 1 sec delivery time) |
| Total | 507 b/s |

TABLE 2

| Ground unit to Aircraft unit Surface Data | |
|---|---|
| Surface Traffic Data to Cockpit receiving aircraft | 320,000 b/sec total 2000 b/sec/aircraft × 160 (160 acquisitions × 20 targ × 100 bits/1 second) |

TABLE 3

| Aircraft and Ground Vehicle Position Reports | |
|---|---|
| Position Reports | 215,000 b/sec. total (430 bits/report × 500 objects/1 second) |

The communication system of the present invention employs 3 to 4 channel types which are compatible with the groupings shown in Tables 1, 2, and 3. In addition, there is also a brief (10–25 millisecond) data burst at the beginning of each amplitude modulated (AM) voice transmission which identifies the aircraft or ground vehicle making the transmission, as previously described in U.S. patent application "AUTOMATIC IDENTIFICATION OF AIRCRAFT FOR AIR TRAFFIC CONTROL COMMUNICATIONS" Ser. No. 08/130,811, filed Oct. 4, 1993 by Richard L. Zinser.

Channel Types

1. Dedicated Data Channel (DDC) One DDC channel is assigned per aircraft by the air traffic control unit. As shown in FIG. 1, the DDC channels, 73, are centered between adjacent existing AM voice channels, 71, thereby having their centers positioned 12.5 kHz from the center of the existing AM voice channels. This results in 720–760 possible DDC channels. These channels carry the information in Tables 2 and 3. A guard band, nominally set at 4.5 kHz bandwidth, is allocated between the AM voice and data frequencies. The guard band serves to reduce interference from existing low frequency tolerance VHF radios. DDC 73 are time division multiplexed access (TDMA) channels with time slots allocated for position reports (downlink) and surface traffic data (uplink).

2. Control Uplink Channel (CUC). The CUC is a single broadcast frequency for transmitting digital information that may be centered on an existing 25 kHz spaced voice channel 71. One CUC is allocated per airport. In an alternate embodiment, the contiguous 48 states may use the same CUC band. A ground unit decides which DDC is to be allocated to an aircraft unit and transmits that DDC channel assignment to the aircraft on the CUC. The CUC is also used for all other ATC functions shown in Table 1 (if they are not handled on the DDC).

3. Control Downlink Channel (CDC). This channel could also be a single broadcast frequency centered one of the existing 25 kHz spaced voice channels 71. One CDC channel is allocated per airport. Also, in an alternate embodiment, the contiguous 48 states may use the same CDC band. Acknowledgements of CUC instructions are transmitted from aircraft to ground on the CDC.

4. Broadcast Channel (BC). This channel is intended for use at lower-traffic airports. It carries a continuous broadcast of surface traffic data for all aircraft being worked (information in Table 2). Use of this type of channel can net a significant cost savings by eliminating the need for the entire bank of DDC uplink transmitters. This digital channel could be allocated on a new 2.5 kHz, or existing 25 kHz channel.

Dedicated Data Chinreel Setup Sequence

The sequence of events during communication, using the present invention would be as follows:

1. An aircraft makes its first voice contact with terminal area ATC on a conventional voice channel allocated for this ground unit. A 10 to 25 millisecond aircraft identification (ID) data burst is transmitted at the beginning of each AM transmission identify the aircraft. The data burst would be transmitted upon activation of the aircraft radio's push-to-talk switch, "key button". The aircraft ID may be encoded as 2 level AM digital data, when the microphone key button is first depressed, or after the key button is released. In one embodiment, as shown in FIG. 2, it could comprise the following:
   a) a dotting sequence 61, for bit synchronization;
   b) a frame synchronization word, 63 (such as a PN sequence) to mark the beginning of the actual data;
   c) the aircraft's alphanumeric call sign, 65 as listed on a flight plan strip;
   d) an additional field of message bits, 67; and
   e) a cyclic redundancy code (CRC) checksum, 69, for error checking.

2. Digital receivers tapped into the clearance and approach frequencies are activated by the frame sync sequence and strip off the aircraft identification.

3. The ID is checked with a list of current aircraft with assigned DDC; if no match is found, a DDC assignment is made.

4a. In the case of an inbound aircraft, the assignment is transmitted to the aircraft on the CUC.

4b. An outbound aircraft is given its route clearance subsequent to a DDC assignment.

5. A receiver unit in the aircraft unit checks the assignment (and clearance) for error, and transmits an acknowledgement (or negative acknowledgement if an error is detected) on the CDC.

6. The aircraft's data radio, transceiver is then automatically tuned to the assigned DDC and automatic position reporting/traffic data reception is commenced.

There are many other uses for the aircraft ID tags of step 1 as described in the aforementioned patent application Ser. No. 08/130,811 Pilots will not have to verbally give the aircraft's call sign, ID, and indication of the most recent transmitting aircraft can be made on the controller's radar display, or on an additional alphanumeric display to an air traffic controller (ground unit) who does not have access to a radar display. In the case of a radar display, the data block of the transmitting aircraft could be displayed in reverse video, and a list of the last several aircraft calling could be displayed near the system data area. It is possible for an aircraft to "check in" on a voice frequency merely by keying the microphone. This could save an appreciable amount of air time.

The present invention employs a spectrally efficient, coded phase modulation for the DDC to reduce interference to, and from, existing AM voice radios. Using a phase modulation with nearly constant envelope characteristics will minimize cross-interference to, and from, an adjacent AM signal. Furthermore, any interference detected on the AM frequencies will sound like white noise, which is very familiar to AM voice radio users.

Additional protection of existing VHF voice channels can be provided by the air traffic control unit by allocation of DDC frequencies which do not interfere with any AM voice frequencies assigned within the radio line of sight (RLOS). For example, if 100 AM voice frequencies within the RLOS are in a local terminal area, there are more than 500 frequencies available for DDC allocations. This allows the channel allocation unit to "lock out" both of the DDC channels (total of 200) within the RLOS of the voice frequencies. Such an allocation scheme should nearly eliminate any interference to the data transmissions caused by off-frequency existing voice radios. The aggregate raw data capacity of the proposed system (of the present example) would thus lie between 4 Mb/sec (500 channels×8000 b/sec) and 8 Mb/sec (500×16000).

The TDMA protocol of the present invention allow flexibility in configuring any digital channel. Address bits, included with every slot transmission, identify the message as digital voice or data. Ground stations can transmit data (i.e. clearances, weather maps, etc.) during periods of voice inactivity. A system "heartbeat" synchronization signal, transmitted by ground stations, sets the timing and contention standards for airborne units. Aircraft may communicate directly with other aircraft known as "talk-around", employing this synchronization. Talk around is required for unicom or multicom services in remote areas can utilize these timing signals or use self synchronization by monitoring an existing over-the-air exchange. Non-periodic, ground-controlled, access-on-demand slot structures can be used for automatic dependant surveillance (ADS) position reporting.

FIG. 3 is a simplified block diagram of the present invention. An aircraft unit, 10, typically in an aircraft, has a aircraft identification (ID) transmission unit, 11 which is provided an aircraft ID, or from a ID storage unit, 13. This aircraft ID is encoded in the proper modulation scheme by an encoder, 19, and transmitted on a predefined channel, which may be centered on the predefined conventional voice channel for a particular airport ground unit, 30, with which'the aircraft is trying to communicate. This predefined channel may be the control downlink channel (CDC). The proper modulation scheme here is digital 2-level amplitude modulation (AM) since that is the method used by conventional radio voice communications. Aircraft ID unit 11 also may, in another embodiment, have incorporated a voice transmit unit, 15, which transmits sounds provided to a microphone, 17 over conventional voice radio frequencies. Aircraft ID transmit unit 11 sends the encoded aircraft ID along with the voice message such that it may be separated later at ground unit 30. An aircraft receive unit, 31, in ground unit 30, receives the transmitted signal, separates the voice and encoded aircraft ID and provides the encoded aircraft ID to a decoder 39 to decode it into an aircraft ID. A voice receive unit, 35, may optionally demodulate the voice signal and play it on a sound output unit 37.

A DDC allocation unit, 41, determines which dedicated data channel frequency is available which causes minimal interference to ongoing voice communication frequencies, and other active DDC frequencies. The frequency assigned must be spaced 12.5 kHz between existing channels allocated for conventional voice communications.

DDC allocation unit 41, provides the assigned frequency to a CUC transmitter, 43, which transmits the frequency assigned to a CUC receiver on a control uplink channel predetermined for all aircraft to use for this ground unit 30. Optionally voice may be transmitted with a microphone 47, a voice transmit unit 45, and a voice receive unit 47 and a sound output unit 27, in ground unit 30 and aircraft unit 10, respectively.

CUC receive unit 23 provides the assigned frequency to a DDC transceiver 29 in aircraft unit 10. This causes DDC transceiver 29 to be configured to transmit and receive digital radio signals at the assigned frequency.

The assigned frequency from DDC allocation unit 41 is directly provided to a DDC transceiver 49 in ground unit 30. This causes DDC transceiver 49 to be configured to transmit and receive digital radio signals with aircraft transceiver 29 at the assigned frequency. Since both transceivers are transmitting and receiving on the same frequency, time sharing is required. Conventional methods of time sharing will be applicable.

Typically, the communication will be quadrature phase shift keyed (QPSK), or differential quadrature phase shift keyed (DQPSK) modulated. By employing known constrained trellis coded modulation, the bandwidth may be minimized, thereby reducing adjacent channel interference as described in U.S. patent applications "A Trellis Coded Modulation Scheme with Low Envelope Variation for Mobile Radio" Ser. No. 08/086,798; and "A Modulation Scheme with Low Envelope Variation for Mobile Radio" Ser. No. 08/086,797, both by Rajaram Ramesh, both filed Jul. 6, 1993, both assigned to the present assignee, and both incorporated by reference.

The power envelope may be manipulated by trellis coded modulation techniques to cause a substantially constant amplitude envelope on a DDC frequency, to minimize any interference to a conventional voice channel and cause it to appear as 'white noise'.

The communications system of the present invention embodies the following capabilities and features:
Use of existing 118–137 MHz band;
Initial preservation of the existing 760 VHF AM voice channels and related services;
760 to 1520 new digital voice channels that are in addition to the AM service; the number of new digital channels depends on full or half duplex operational requirements;
Eventual migration to a fully digital system with up to 3040 voice channels;
Full or half duplex operation;
High quality digital speech, exceeding that required in
Federal Standard 1016 (FS-1016);
Reconfigurable Time Division Multiple Access (TDMA) protocol that allows simultaneous voice and data service with ASTA and ADS capabilities;
Automated channel switching at handoff is possible due to the data transfer capabilities;
Number of voice channels can be upgraded as speech coding technology evolves without restructuring the spectral allocation; the TDMA protocol can be structured with multiple slots per speech frame.

The communication scheme of the present invention also allows the following safety features:
1) Maintaining the existing AM voice channels provides a proven backup to the new digital service. Migration can be accomplished slowly, with dual mode service initially available to all affected users.
2) It can be configured so that the controller's transmission can never be blocked by an aircraft's "stuck mike, a microphone button stuck in the 'transmit' position". Full duplex service is also available.
3) Since the present invention employs digital service, it can be protected by encryption codes for positive identification of the true air traffic control unit and prevent "phantom controllers" from issuing false clearances.

Because of recent advances in digital signal processing (DSP) chips, it is plausible that a dual-mode aircraft radio could be developed that would cost about the same as an all-digital unit. The analog/digital radio could provide communication, navigational, and data services, and also act as a global positioning system (GPS) receiver. The radio unit may be constructed as a single panel-mount unit affordable to the private aircraft owner.

Simulation and hardware tests were conducted to examine the interference between the recommended new digital service and the existing AM voice service. These tests have consisted of operating a single AM voice channel and a single 16 kb/sec DQPSK data channel on carrier frequencies 12.5 kHz apart. Although the amplitude and frequency shaping characteristics of DQPSK may not be optimal for this application, it is indicative of possible data transmission signals.

Simulation Tests

Software simulation tests were conducted to measure interference from the existing AM voice to the new digital channel. The tests were conducted to measure the bit error rates induced by AM interference for various levels of the AM and data signal. The parameters for the simulation are given in Table 4.

TABLE 4

| Simulation Parameters | |
|---|---|
| Sampling Frequency | 960 kHz |
| Channel Impairments | adjacent AM; additive Gaussian white noise |
| AM Carrier | 60.5 kHz |
| DQPSK Carrier | 48 kHz |
| AM Modulation Source | Male/Female Speakers, 50% activity ratio DOD balanced test sentences 8 kHz bandwidth |
| AM Voice Modulation Depth | 50% average |
| AM Voice IF Filter Width | 15 kHz @ 6 dB points |
| Data Rate | 16 kb/sec (8 ksymbols/sec) |
| Data Source | Random |
| Data Detection | differential non-coherent tangent type |
| Data Transmission Filter | Baseband, 720 point square root raised cosine |
| Data Receive Filter | Baseband, 60 point windowed square root raised cosine |

Two simulation experiments were conducted. The first experiment was conducted with the exact parameters given in Table 4; the results are given in Table 5. Table 5 shows the relative power level of the DDC carrier (compared to the AM carrier) and the corresponding measured bit error rate. Because of the short lengths of the simulation runs, only bit error rates greater than $10^{-6}$ could be detected. Lower rates produce no errors during the simulation. The Table shows that this system is capable of providing very low error rates with the DDC data signal 40 dB below the adjacent AM voice signal. At this level, users of the adjacent AM voice frequency would not perceive any interference due to DDC operation.

TABLE 5

| DDC/AM Power Ratio vs Bit Error Rate | |
|---|---|
| DDC Carrier Level Relative to AM Voice Carrier Level | Measured Bit Error Rate |
| −60 dB | 1.34 E-01 |
| −55 dB | 1.29 E-02 |
| −50 dB | 6.03 E-04 |
| −45 dB | 4.69 E-05 |
| −40 dB | 6.25 E-06 |
| −35 dB or greater | no errors detected |

The second simulation experiment was designed to evaluate the effects of an off-frequency adjacent AM voice transmission. An offset of −1.0 kHz was introduced in the AM carrier (59.5 kHz); this effectively moves the interferer closer to the DDC center. The results of this simulation are presented in Table 6. The offset results in a degradation of performance, but even with the DDC level 30 dB below the AM level, no interference would be perceived by users of the adjacent channel.

TABLE 6

| DDC/AM Power Ratio vs Bit Error Rate for 1 kHz Offset AM Carrier | |
|---|---|
| DDC Carrier Level Relative to AM Voice Carrier Level | Measured Bit Error Rate |
| −50 dB | 7.84 E-03 |
| −45 dB | 1.04 E-03 |
| −40 dB | 1.87 E-04 |
| −35 dB | 2.50 E-05 |
| −30 dB | 3.12 E-06 |
| −25 dB or greater | no errors detected |

Conclusions and Analysis

The present invention is capable of utilizing the spectrum between the 25 kHz spaced VHF aircraft voice frequencies for data transmission. With the data signal levels 40 dB below the AM voice carrier the bit error rate due to adjacent channel interference was estimated to be on the order of $10^{-5}$, with negligible interference to the adjacent voice channel. Frequency offsets in existing VHF radios of up to 1 kHz caused some degradation, but would not reduce the utility of the present invention.

What is claimed is:

1. A system for communicating information between an aircraft unit and a ground unit comprising:
   a) an aircraft ID transmission means in the aircraft unit, capable of transmitting an aircraft identification on an existing radio voice channel;
   b) an aircraft ID receive means in the ground unit, capable of receiving the transmitted aircraft identification from the aircraft ID transmission means;
   c) a dedicated digital channel (DDC) allocation unit in the ground unit, coupled to the aircraft ID receive means for determining if there is a channel currently allocated to this aircraft ID and corresponding aircraft, and if not, for allocating a frequency for digital communications with this aircraft which is between existing aircraft voice channels;
   d) a control uplink channel (CUC) transmitter in the ground unit, coupled to the DDC allocation unit, for transmitting the DDC frequency information on a control uplink channel (CUC) frequency which has been predetermined for this ground unit;
   e) a CUC receiver in the aircraft unit capable of receiving the DDC frequency allocated for the aircraft;
   f) a DDC transceiver in the aircraft unit, responsive to the CUC receiver, for communicating digital information with the ground unit on the allocated DDC frequency with minimal interference; and
   g) a DDC transceiver in the ground unit, responsive to the CUC receiver, for communicating digital information with the aircraft unit on the allocated DDC, frequency with minimal interference.

2. The system for communicating information of claim 1 further comprising aircraft information sources coupled to the aircraft DDC transceiver for providing information to be transmitted to the ground unit.

3. The system for communicating information of claim 1 further comprising ground information sources coupled to the ground DDC transceiver for providing information to be transmitted to the aircraft unit.

4. The system for communicating information of claim 1 wherein the aircraft and ground transceivers are transceivers capable of transmitting digital information with substantially all power is concentrated in frequencies which do not overlap with adjacent voice channel frequencies.

5. The system for communicating information of claim 1 wherein the aircraft and ground transceivers are transceivers capable of transmitting digital information with substantially constant power distribution over a frequency range thereby appearing as 'white noise' to conventional voice radios monitoring adjacent voice channels.

6. A method of communicating information between an aircraft unit and a ground unit comprising the steps of:
   a) transmitting from the aircraft unit to the ground unit, an aircraft identification (ID) which identifies the aircraft unit;
   b) receiving the aircraft ID at the ground unit and determining if the aircraft ID has been previously assigned to a dedicated data channel (DDC) frequency, and if not,
      i. assigning at the ground unit, a DDC frequency being a frequency between channels which have been previously assigned to conventional voice radio transmissions, to this aircraft ID and aircraft unit,
      ii. transmitting from the ground unit to the aircraft unit, the DDC frequency assigned to this aircraft ID, iii. configuring a digital transceiver in the ground unit to transmit and receive digital information on the assigned DDC frequency, and iv. configuring a digital transceiver in the aircraft unit to transmit and receive digital information on the assigned DDC frequency; and c) communicating digital information between the aircraft unit and the ground unit in a time sharing fashion on the assigned DDC frequency.

7. The method of communicating information of claim 6 wherein the step of transmitting from the aircraft unit to the ground unit, an aircraft identification (ID), comprises the steps of:

a) acquiring an aircraft ID from a storage device;

b) encoding the aircraft ID with amplitude modulation (AM) into a digital AM signal;

c) transmitting the digital AM signal along with a conventional radio voice transmission from the aircraft unit to the ground unit;

d) receiving the AM signal and the conventional radio voice transmission at the ground unit;

e) separating the digital AM signal from the conventional radio voice transmission; and f) decoding the digital AM signal into the aircraft ID.

8. The method of communicating information of claim 6 wherein the step of assigning at the ground unit, a DDC frequency, comprises the steps of:

a) determining which conventional AM voice frequencies are currently within the radio line of sight (RLOS) for the aircraft unit and the ground unit which are currently in use;

b) assigning a DDC frequency that is not adjacent to any of the conventional AM voice frequencies determined in step "a)" for communication between the aircraft unit and the ground unit.

9. The method of communicating information of claim 6 wherein the step of communicating digital information between the aircraft unit and the ground unit, comprises the steps of:

a) configuring the transceivers to transmit digital information in a bandwidth constrained to provide substantially all of its power between conventional voice channels;

b) configuring the transceivers to receive digital information in substantially the same bandwidth the transceivers are transmitting; and c) communicating digital information between transceivers in a time sharing fashion.

10. The system for communicating information between an aircraft unit and a ground unit of claim 1 wherein a) the aircraft ID transmission means further comprises a voice transmission means capable of transmitting conventional voice messages on the conventional voice channels; and b) the aircraft ID receive means further comprises a voice receive means capable of receiving conventional voice messages on the conventional voice channels to result in a dual-mode aeronautical radio.

* * * * *